(12) United States Patent
Shinohara et al.

(10) Patent No.: US 6,744,708 B2
(45) Date of Patent: Jun. 1, 2004

(54) NEAR-FIELD OPTICAL HEAD (75) Inventors: Yoko Shinohara, Chiba (JP); Yasuyuki Mitsuoka, Chiba (JP); Manabu Oumi, Chiba (JP); Nobuyuki Kasama, Chiba (JP); Hidetaka Maeda, Chiba (JP); Kenji Kato, Chiba (JP); Takashi Niwa, Chiba (JP)

(73) Assignee: Seiko Instruments Inc., Chiba (JP)

( * ) Notice: Subject to any disclaimer, the term of this patent is extended or adjusted under 35 U.S.C. 154(b) by 523 days.

(21) Appl. No.: 09/833,147

(22) Filed: Apr. 11, 2001

(65) Prior Publication Data

US 2001/0033529 A1 Oct. 25, 2001

(30) Foreign Application Priority Data

Apr. 20, 2000 (JP) .................................... 2000-119753

(51) Int. Cl.$^7$ ................................................ G11B 7/00
(52) U.S. Cl. .............................. 369/44.23; 369/112.23
(58) Field of Search ................... 369/112.01, 44.23, 369/44.24, 112.23

(56) References Cited

U.S. PATENT DOCUMENTS

| | | | |
|---|---|---|---|
| 4,682,315 A | 7/1987 | Uejima | 369/45 |
| 5,365,535 A | 11/1994 | Yamaguchi et al. | 372/38 |
| 5,557,597 A | 9/1996 | Lee et al. | 369/112 |
| 5,689,480 A | * 11/1997 | Kino | 369/112.23 |
| 5,859,819 A | 1/1999 | Miyabe et al. | 369/44.41 |
| 6,304,527 B1 | 10/2001 | Ito et al. | 369/44.23 |

FOREIGN PATENT DOCUMENTS

| | | |
|---|---|---|
| EP | 0259148 | 3/1988 |
| EP | 0426053 | 5/1991 |

OTHER PUBLICATIONS

Patent Abstracts of Japan, vol. 1999, No. 14, Dec. 22, 1999, publication No. 11265520, publication date Sep. 28, 1999.

* cited by examiner

*Primary Examiner*—Nabil Hindi
(74) *Attorney, Agent, or Firm*—Adams & Wilks (57) ABSTRACT

A near-field optical head capable of rapid recording and/or reproducing of the information is provided. The near-field optical head condenses the light from the light source and irradiates the light on the minute opening 1. Then, by means of detecting the reflected light from the light condensing mark 501 provided on the circumference of the minute opening 1, the relative position between the light condensing point condensed by the lens and the light condensing mark 501 is detected so that the light condensing point is controlled to follow the light condensing mark 501. Thus, intensive and constant near-field light can be generated in the minute opening 1 and a signal having high S/N can be obtained even by a rapid scanning of the minute opening 1 over the recording medium so that rapid recording and/or reproducing of the information is made possible.

19 Claims, 9 Drawing Sheets

NEAR-FIELD OPTICAL HEAD

BACKGROUND OF THE INVENTION

1. Field of the Invention

The present invention relates to a near-field optical head for optical information recording/reproducing apparatus that records and/or reproduces the information on a high-density recording medium using near-field light.

2. Description of the Related Art

Now, most of the information recording/reproducing apparatus using light records or reproduces information on optical disks applied as information recording/reproducing medium. Especially among them, compact disk (CD) as one of the optical disk is widely used as recording medium capable of reproducing large quantity of information. Pit (recording unit of the information) having a size nearly equal to the wavelength of the laser beam used for reproducing the information and a depth about one fourth of the wavelength is formed on the surface of CD which is read using coherent light (reproducing of the information).

The optical information recording/reproducing apparatus of this kind is on the way toward the increase in capacity and the downsizing thereby requiring for ever-denser approach of the recording pit. However, in a conventional optical information recording/reproducing apparatus, optical lens system employed in optical microscope is generally used. This lens system can not reduce the spot diameter of the light by more than half a wavelength because of the diffraction limit of the light. Therefore, there was a limitation of the information recording density.

As an approach for breaking the limitation of the information recording density, research on the information recording/reproducing method is pursued utilizing the interaction between the near-field light emitted from a minute aperture and the minute region. By means of using near-field light, it is made possible to deal with the optical information in a region of less than a wavelength which was thought to be a limit in conventional optical lens system.

As an example of the information reproducing method using near-field light, a method is known in which near-field light is generated from a minute opening put in a proximity of the surface of the recording medium and diffracted light transformed by the interaction between the minute structure recorded as information on the surface of the recording medium is detected by photo detecting system provided separately. As an example of information recording, a method is known in which near-field light generated from a minute opening is irradiated on the surface of the recording medium to perform recording by means of changing the shape of a minute region of the recording medium or changing refractive index or light transmission factor. In this way, with the use of near-field optical head having a minute opening, it becomes possible to achieve an ever-denser approach of the recording pit that exceeds the limit of the light diffraction which conventional optical information recording/reproducing apparatus could hardly realize.

However, near-field optical head of above-mentioned kind has a low utilization factor of light and generates near-field light of quite small intensity. Therefore, in case of rapid recording and/or reproducing information, there was a problem that light with sufficient quantity can not be obtained in photo detecting system upon reproducing the information and that light with sufficient quantity can not be obtained as for the change in shape of the minute region, refractive index or light transmission factor upon recording the information. Consequently, in the case of constructing optical information recording/reproducing apparatus using near-field optical head, there was a problem that nothing but low rate recording and/or reproducing was possible.

SUMMARY OF THE INVENTION

Thus, this invention is proposed in consideration of above-mentioned related art and the object of the invention is to provide a near-field optical head capable of rapid recording and/or reproducing information by means of generating constant intensive near-field light continually.

In order to solve the aforementioned problem, the first near-field optical head according to the present invention is related to a near-field optical head for recording and/or reproducing information on recording medium using near-field light comprising a light source, a lens for condensing light from said light source, a light condensing mark having a concave or a convex shape for reflecting the light from said light source, a minute opening provided in said light condensing mark, detecting means for detecting the relative position between the light condensing point condensed by said lens and said light condensing mark, and servo means for controlling said light condensing point to follow said light condensing mark.

Consequently, according to the near-field optical head related to the first invention, by means of irradiating condensed light on the light condensing mark, the energy density of the incident light on the minute opening is increased so that the near-field light in the minute opening can be intensified. In addition, with the use of a detecting means for detecting the relative position between the light condensing point and the light condensing mark and means for controlling the light condensing point to follow the light condensing mark, the light condensing point exists always on the light condensing mark so that the light can be irradiated continually with constant quantity on the minute opening provided in the light condensing mark. As a result, intensive and constant near-field light can be generated in the minute opening at all times so that rapid recording and/or reproducing of the information can be made possible using the near-field optical head.

Further, the second near-field optical head according to the present invention is related to the first near-field optical head characterized by that said servo means comprises a lens actuator for moving said lens.

Further, the near-field optical head according to the third invention is related to the first or the second near-field optical head characterized by that said servo means comprises beam deflecting means provided between said lens and said light source.

Consequently, intensive and constant near-field light can be irradiated always on the light condensing mark because the light condensing point is controlled to follow the light condensing mark by means of the lens movement by the lens actuator or by means of the beam deflecting means. Therefore, intensive and constant near-field light can be generated in the minute opening at all times so that rapid recording and/or reproducing of the information is made possible using the near-field optical head. In addition, as the light condensing point is controlled to follow the light condensing mark, similar function can be realized even though the manufacture or the assembly accuracy of the near-field optical head may be comparatively low. Therefore, cheap near-field optical head can be provided.

Further, the fourth near-field optical head according to the present invention is related to the first to the third near-field optical head characterized by that said detecting means comprises a photo detector for detecting the reflected light from said light condensing mark.

Consequently, because the light reflected back by the light condensing mark is used, the detection of the relative position between the light condensing point and the light condensing mark can be performed simultaneously with the recording and/or the reproducing of the information. Therefore, intensive and constant near-field light can be generated in the minute opening at all times so that rapid recording and/or reproducing of the information is made possible.

Further, the fifth near-field optical head according to the present invention is related to the fourth near-field optical head characterized by that said detecting means employs knife-edge method for detecting the relative position between the light condensing point and said light condensing mark along the direction approximately in parallel with the optical axis.

Further, the sixth near-field optical head according to present invention is related to the fifth near-field optical head characterized by that said detecting means comprises a two-piece photo detector for receiving a part of said reflected light and a knife-edge for cutting off a part of said reflected light.

Further, the seventh near-field optical head according to the present invention is related to the fourth near-field optical head characterized by that said detecting means employs astigmatism method for detecting the relative position between the light condensing point and said light condensing mark along the direction approximately in parallel with the optical axis.

Further, the eighth near-field optical head according to the present invention is related to the seventh near-field optical head characterized by that said detecting means comprises a four-piece photo detector for receiving a part of said reflected light and a cylindrical lens provided between said four-piece photo detector and said lens.

Further, the ninth near-field optical head according to the present invention is related to the fourth near-field optical head characterized by that said detecting means employs beam size detecting method for detecting the relative position between the light condensing point and said light condensing mark along the direction approximately in parallel with the optical axis.

Further, the tenth near-field optical head according to the present invention is related to the ninth near-field optical head characterized by that said detecting means comprises beam splitter means for dividing said reflected light into two beams and a pair of three-piece photo detector each for receiving said split beam divided by said beam splitter into two beams.

Further, the eleventh near-field optical head according to the present invention is related to the fourth near-field optical head characterized by that said detecting means employs image rotation method for detecting the relative position between the light condensing point and said light condensing mark along the direction approximately in parallel with the optical axis.

Further, the twelfth near-field optical head according to the present invention relates to the eleventh near-field optical head characterized by that said detecting means comprises a two-piece photo detector for receiving a part of said reflected light, a cylindrical lens and a knife-edge provided between said two-piece photo detector and said cylindrical lens.

Consequently, according to the fifth to the twelfth invention, because a conventional focusing technology for optical disk is used as means for detecting the relative position between the light condensing point and the light condensing mark along the direction approximately in parallel with the optical axis, highly precise detection of the relative position is made possible despite using a simplified structure. As a result, intensive and constant near-field light can be generated in the minute opening at all times so that rapid recording and/or reproducing of the information is made possible using the near-field optical head having a structure of this kind.

Further, the thirteenth near-field optical head according to the present invention is related to the fourth near-field optical head characterized by that said detecting means employs three beam method for detecting the relative position between the light condensing point and said light condensing mark along the direction approximately perpendicular to the optical axis.

Further, the fourteenth near-field optical head according to the present invention relates to the thirteenth near-field optical head characterized by that said detecting means comprises a diffraction grating provided between said light source and said lens and a two-piece photo detector for receiving light diffracted by said diffraction grating and subsequently reflected back by said light condensing mark.

Further, the fifteenth near-field optical head according to the present invention is related to the fourth near-field optical head characterized by that said detecting means employs push-pull method for detecting the relative position between the light condensing point and said light condensing mark along the direction approximately perpendicular to the optical axis.

Further, the sixteenth near-field optical head according to present invention is related to the fifteenth near-field optical head characterized by that said detecting means comprises a two-piece photo detector for receiving a part of said reflected light.

Consequently, according to the thirteenth to the sixteenth near-field optical head, by means of utilizing conventional tracking technology for optical disk used as means for detecting the relative position between the light condensing point and the light condensing mark along the direction approximately perpendicular to the optical axis, highly precise detection of the relative position is made possible despite using a simplified structure. Therefore, intensive and constant near-field light can be generated in the minute opening at all times so that rapid recording and/or reproducing of the information is made possible using the near-field optical head having a structure of this kind.

Further, the seventeenth near-field optical head according to the present invention is related to the first to sixteenth near-field optical head characterized by that the depth of said light condensing mark is approximately between one eighth and one fourth of the effective wavelength of the light irradiated on said light condensing mark.

Consequently, the reflected light from the condensing mark interferes to each other in accordance with the variation of the relative position between the light condensing point and the light condensing mark so that the intensity distribution of the reflected light is changed. Therefore, forming the shape of the light condensing mark precisely, the relative position between the light condensing mark and the light condensing point can be detected precisely despite using a simplified structure. As a result, intensive and constant near-field light can be generated in the minute opening at all times so that rapid recording and/or reproducing of the information is made possible using the near-field optical head having a structure of this kind.

Further, the eighteenth near-field optical head according to the present invention is related to the first to seventeenth near-field optical head characterized by that said minute opening is provided on said floating slider.

Consequently, with the use of the floating slider, the relative speed between the minute opening provided on the floating slider and the recording medium with recorded information can be increased. As a result, a rapid scanning of the minute opening over the recording medium is made possible so that rapid recording and/or reproducing of the information becomes possible using the near-field optical head.

DESCRIPTION OF THE PREFERRED EMBODIMENTS

The invention is explained in detail with reference to the accompanied drawings hereinafter. Incidentally, the invention is not restricted to the embodiment.

(First Embodiment)

Figure 1:
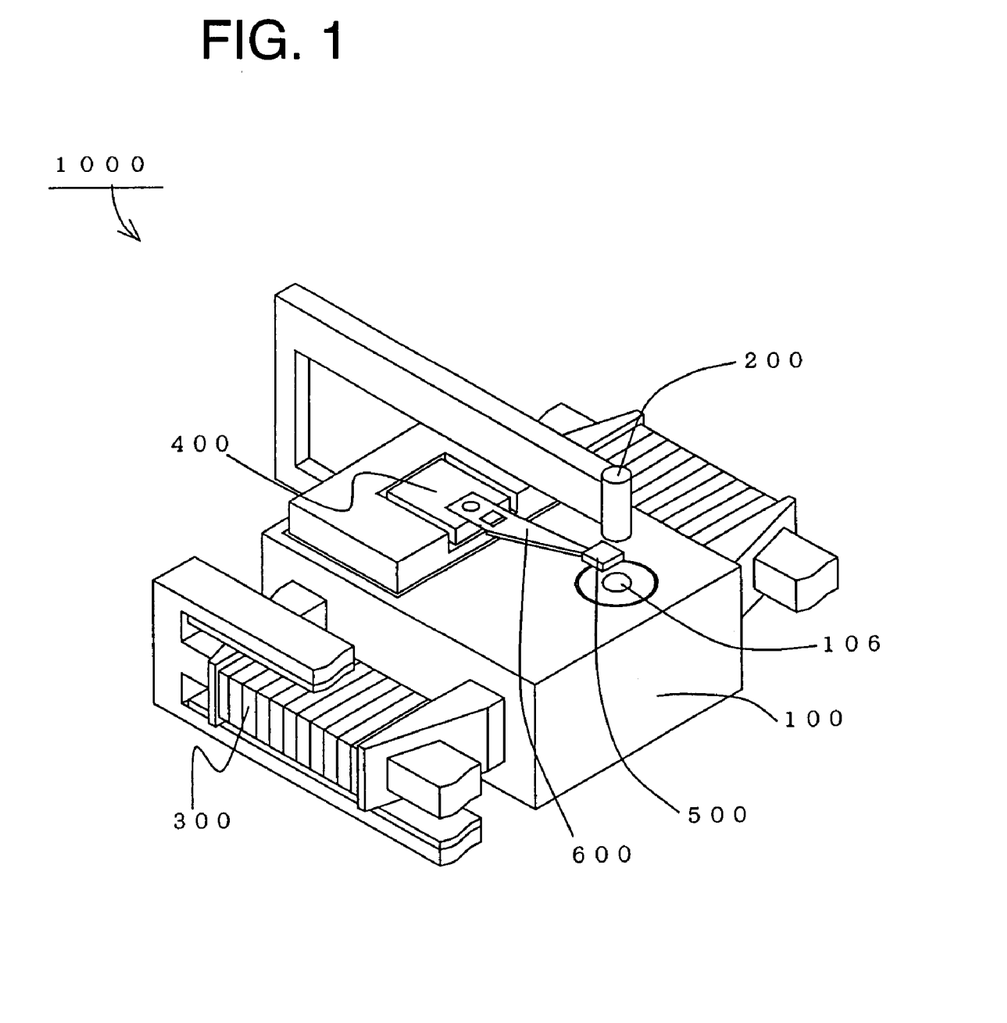
FIG. 1 is a schematic perspective view showing the near-field optical head related to the first embodiment according to the present invention.
Figure 2:
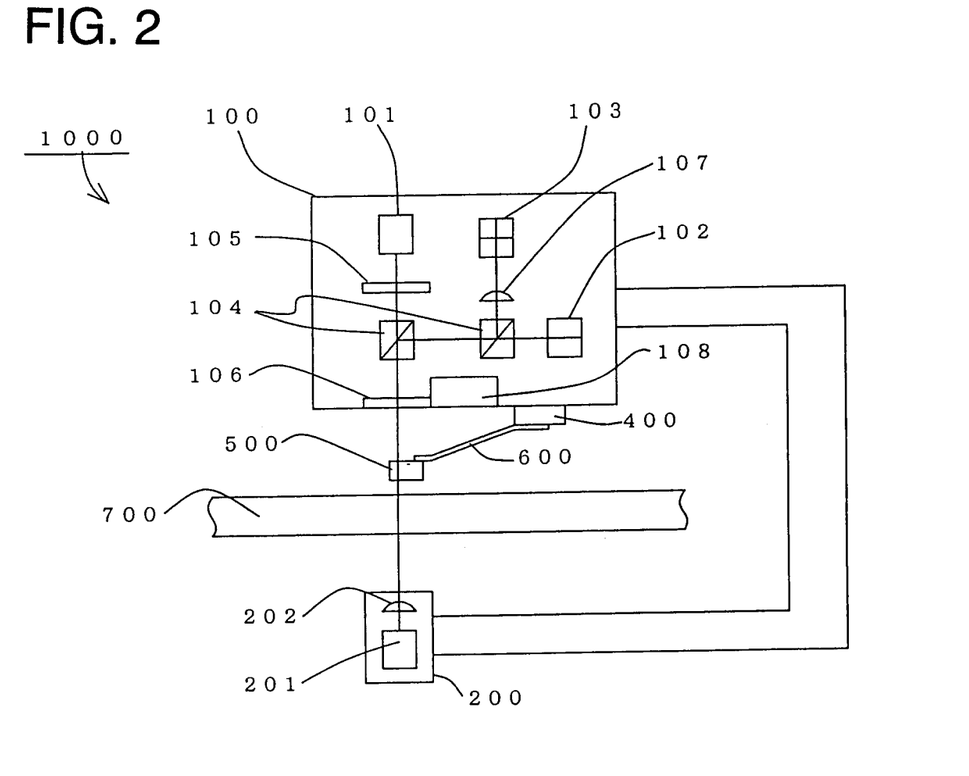
FIG. 2 is a block-diagram showing the near-field optical head related to the first embodiment according to the present invention.
Figure 3:
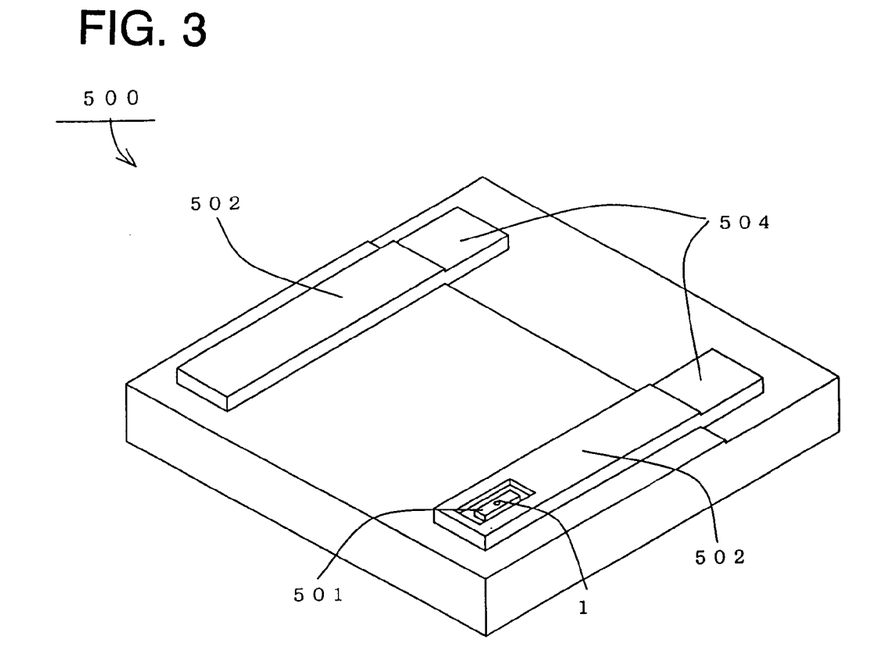
FIG. 3 is an illustration showing the construction of a slider that is a part of the near-field optical head related to the first embodiment according to the present invention.
Figure 4:
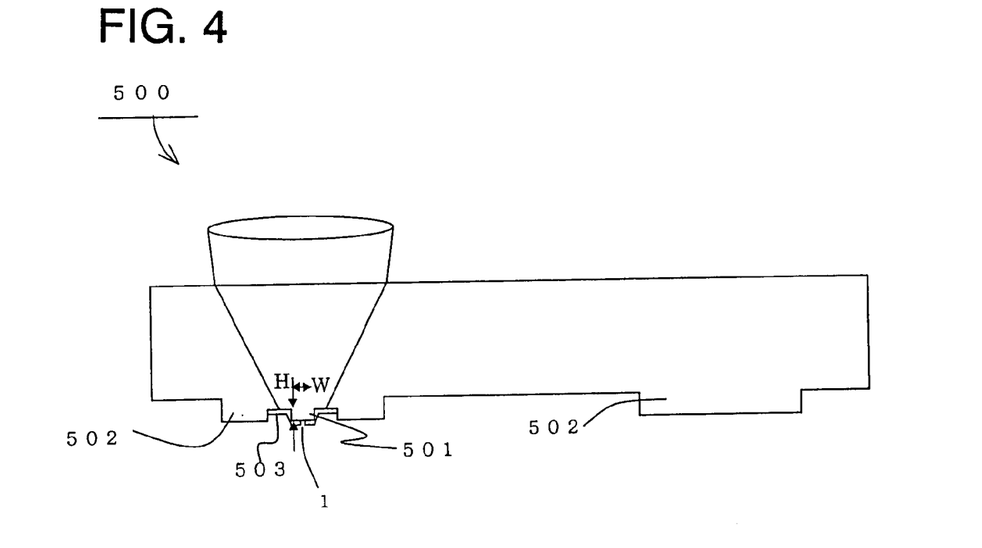
FIG. 4 is an illustration showing the cross-section construction of the slider which is apart of the near-field optical head related to the first embodiment according to the present invention.

FIG. 1 shows a schematic perspective view of a near-field optical head related to the first embodiment according to the present invention. FIG. 2 is a block-diagram of the near-field optical head 1000. FIG. 3 shows an enlarged block-diagram of a slider 500 as a part of the near-field optical head 1000. FIG. 4 shows a cross-sectional view of the slider 500.

As shown in FIG. 1, a near-field optical head 1000 comprises an optical element part 100, a photo detector part 200, a coarse control actuator 300, a fine control actuator 400, a slider 500 and a suspension 600. The head 1000 reproduces the information recorded on the surface of the recording medium 700 (not shown but provided between the slider 500 and the photo detector part 200) using near-field light generated from the slider 500.

According to the construction of the near-field optical head 1000, a suspension 600 supports the slider 500 pushing thereof against the surface of the recording medium 700 rotating in a high speed. The suspension 600 is coupled to the fine control actuator 400 which in turn is coupled to the optical element part 100. Further, the coarse control actuator 300 moves the photo detector part 100 and the photo detector part 200 arranged at an opposite side with respect to the recording medium 700.

As shown in FIG. 2, the photo element part 100 comprises a light source 101, a two-piece photo detector 102, a four-piece photo detector 103, a half mirror 104, a collimator lens 105, a condenser lens 106, a cylindrical lens 107 and a lens actuator 108. The light source 101 is, for example, a semiconductor laser (wavelength $\lambda$=680 nm). In addition, the lens actuator 108 is movable in three-dimensions within a movable range from several tens to several hundreds of $\mu$m and can be consisted of a voice coil motor for tracking and focusing an objective lens used, for example, in CD player and a spring structure.

The photo detector part 200 is, for example, consisted of a photo diode 201 and a light receiving lens 202.

The coarse control actuator 300 moves along the radial direction of the recording medium 700 and its moving range is approximately the same as the radial length of the information recording area of the recording medium 700. The actuator 300 can be consisted of linear type voice coil motor that seeks, for example, the pickup of CD player.

The fine control actuator 400 moves along the same direction as that of the coarse control actuator 300 and its moving range is more than several $\mu$m and its positioning accuracy is about 10 nm. The actuator 400 can be consisted of layer type piezoelectric actuator.

As shown in FIG. 3, the slider 500 is provided with a pair of skiing parts 502 acting as an air bearing surface (ABS). Additionally, both of the two skiing part 502 are formed respectively a minute down step 504 at a side which is an inlet of air current while acting as ABS. A light condensing mark 501 is provided on one of the skiing parts 502 and further a reflective film 503 is provided on the light condensing mark 501 and its surroundings. In addition, a minute hole 1 is provided in the light condensing mark 501. Incidentally, the light condensing mark 501 is preferably provided on the outlet side near the recording medium 700 because the slider 500 floats locating the inlet side of the air current in a high position and the outlet side thereof in a low position. The slider 500 has a size of about 1 mm square and several hundreds $\mu$m thickness. Both of the two skiing parts 502 is a square protrusion of about 10 $\mu$m height and has a structure in which the minute down step provided on the skiing part 502 is about 150 nm lower than the upper side of the skiing part 502. As shown in FIG. 4, the light condensing mark 501 has a structure which is 0.5 $\mu$m in width W, 110 nm in depth H and about 1 $\mu$m in length L (along a direction perpendicular to the sheet in the drawing). The depth H is decided according to the wavelength $\lambda$ and the relationship therebetween is defined as follows.

$$H=(\tfrac{1}{8})\times\lambda/N \text{ to } (\tfrac{1}{4})\times\lambda/N$$

where N is refractive index of the material of the slider 500 and $\lambda/N$ is referred to as effective wavelength. As is described later, the above-mentioned light condensing mark has approximately the same size as the pit size of CD because of adopting means for detecting the relative position between the light condensing mark and the light condensing point with the use of tracking and focusing technology adopted by conventional compact disk. Incidentally, the light condensing mark is of a rectangular shape having a short width W and a long length L, where the width W is in parallel with the moving direction of the fine control actuator. As described above, reducing the size (W) of the light condensing mark with respect to the direction in parallel with the moving direction of the fine control actuator, it is made possible to detect precisely the relative position between the light condensing point and the light condensing mark with regard to the motion of the fine control actuator. On the other hand, increasing the length L, the assembling accuracy along the direction of the length L can be improved and the implementation can be simplified. Moreover, forming the beam at the light condensing point in an eclipse shape having its line of apsides along the direction of length L, the implementation can be simplified to a greater degree. Incidentally, the light condensing mark has a concave shape here, but in contrast with this, a similar action may be possible in case of forming it in a convex shape. Additionally, the thickness of the reflective film 503 is about several tens to several hundreds of nm. The thickness of the minute opening 1 is preferably a size less than a hundred nm. Here, the material of the slider 500 is silicon dioxide, and aluminum is used as the material of the reflective film 503.

As shown in FIG. 2, the suspension 600 has a spring structure capable of generating a force of several gf. For example, It may be consisted of a ginbal structure made of stainless steel supporting the head for magnetic disk.

As for the recording medium 700, for example, a glass disk with a center hole (1 inch in diameter) is used. The recording medium 700 rotates at a high speed of several thousands rpm. On the side that faces the slider 500 is vapour deposited by a metal film, which is patterned to form pits. For example, the size of the pit is about several tens nm, the pitch of the pit (the circumferential space of the recording medium 700) is almost the same as that of the pit and the pitch of the track (the radial space of the recording medium 700) is about one hundred to two hundreds of nm. In addition, a protection layer made of, for example, diamond-like-carbon film. etc may preferably be provided on the metal layer in order to prevent the damages of pit.

Incidentally, in addition to the pit for recording data, pits for sampling servo pattern consisted of segment mark and wobble mark and pits for address information of a sector for controlling the seek operation is disposed in front of each sector for the purpose of controlling the head tracking. By means of composing the recording medium 700 in this way, a high-density recording of 100 GB per square cm on the surface of the recording medium 700 and a large recording capacity of nearly 7 GB by on one side of the recording medium 700 of 1 inch in diameter can be realized.

As shown in FIG. 2, for reading the information from the recording medium 700 by means of aforementioned near-field optical head 1000, near-field light generated from the minute opening 1 provided on the slider 500 is used. First of all, a reproducing process of the information from the recording medium 700 using near-field light is explained.

The light emitted from the light source 101 of the photo element part 100 is transformed into collimated light by the collimator lens 105 and travels straight through the half mirror 104. The collimated light is condensed by the condenser lens 106 so as to have a minimum beam diameter at the minute opening 1 of the slider 500 and irradiated on the light condensing mark 501 provided with the minute opening 1. Incidentally, the point where the beam diameter is reduced to the minimum size is referred to the light condensing point. The irradiated light generates near-field light toward the recording medium 700 side of the minute opening 1. Then, the near-field light is scattered on the surface of the recording medium 700 which is put in a proximity within a distance of several tens of nm from the minute opening 1. The scattered light propagates through the recording medium 700 and condensed by the light receiving lens 202 in the photo element part 200 to be detected by the photodiode 201. The quantity of the received light detected by the photo element part 200 varies according to the presence or the absence of the pit on the surface of the recording medium 700. Because the range of the surface of the recording medium 700 irradiated by the near-field light is substantially the same as the diameter of the minute opening 1, the information can be reproduced from the minute pit having a size approximately the same as the minute opening 1. Therefore, it is made possible to reproduce the information recorded with high-density on the recording medium 700 by means of using the near-field light.

In addition, as the condensed light is irradiated on the light condensing mark 501, the energy density of the light incident on the minute opening 1 is high and also the intensity of the generated near-field light is great. Therefore, the quantity of the detected light as well is increased so that the S/N of the detected signal by the photo element part 200 can be improved.

Next, for reading any given information recorded on the recording medium 700, it is required a height control and a tracking control (positioning in the planar direction of the recording medium 700) of the minute opening 1 in a specific area of the recording medium 700 with recorded information. The positioning action is explained hereafter.

At first, as for the height control of the slider 500, floating head technology of the magnetic disk is employed. Rotating the recording medium 700 in a high speed under the condition that the slider 500 is pressed on the surface of the recording medium 700 with a load of several gf, air current is generated on the surface of the recording medium 700 so that the slider 500 floats above the surface of the recording medium 700 by several tens of nm. In case of rotating the recording medium 700 in a high speed, the recording medium 700 vibrates out of planar direction. However, the slider 500 can float keeping a constant height continually above the surface of the recording medium 700 due to the action of the air current flowing between the recording medium 700 and the slider 500.

Next, a description is made about the tracking control of the slider 500.

The near-field optical head 1000 is moved as a whole along the radial direction of the recording medium 700 by the coarse control actuator 300 toward a specific area (target track) of the recording medium 700 where the reproducing information is recorded. In addition, after the minute opening 1 has come close to the target track within 1 $\mu$m, the fine control actuator 400 moves the suspension 600 and the slider 500 in the same direction as the moving direction of the coarse control actuator 300 to the target track. Then, the minute opening 1 is positioned to keep the distance between the minute opening 1 and the target track always about an accuracy of 10 nm. Additionally, the near-field light generated from the minute opening 1 is scattered on the surface of the recording medium 700 to be received by the light receiving element part 200 so that the light receiving element part 200 is coupled to the photo element part 100 to perform an operation following the photo element part 100.

In addition, the moving direction of the coarse control actuator 300 and the fine control actuator 400 extends along the radial direction of the recording medium 700 and the positioning accuracy of the fine control actuator 400 is preferably equal to or less than one tenth of the track pitch of the recording medium 700.

Incidentally, the coarse control actuator 300 and the fine control actuator 400 are controlled by reading the pattern for sampling servo and the sector address provided in front of each sector in the recording medium 700 to recognize the present position of the minute opening 1. Therefore, it is made possible to perform such a highly precise positioning that the distance between the target track and the minute opening 1 is within equal to or less than 10 nm.

As described above, by means of interlocking the action of the coarse control actuator 300 and the fine control actuator 400, it is made possible to enlarge the movable range of the minute opening 1 and to perform a highly precise positioning thereof.

In addition, as for the action of the slider 500 upon reproducing and non-reproducing the information, loading/unloading method is preferable for preventing the wear and the damage of the recording medium 700 and the slider 500.

The recording medium 700 in rotation vibrates with wobbling to the extent about several tens of $\mu$m along the thickness direction. Then, though the optical element part 100 does not move along the height direction, as the slider floats keeping a constant height above the surface of the recording medium 700, the distance between the minute opening 1 and the condenser lens 106 fluctuates to deviate the condensing point from the minute opening 1. Further, as the fine control actuator 400 moves the slider 500 during the tracking control of the slider 500, the minute opening 1 deviates from the light condensing point. As mentioned above, the intensity of the generated near-field light also varies in accordance with the deviation of the relative position between the minute opening 1 and the light condensing point.

Thus, a servo control of the light condensing point for the light condensing mark 501 provided with the minute opening 1 is performed by means of the lens actuator 108 mounted on the condenser lens 106. This servo control consists of means for detecting the relative position between the light condensing mark 501 and the light condensing point with the use of the light reflected from the light condensing mark 501 provided with the minute opening 1 to enter the optical element part 100 and means for controlling the light condensing point to follow the light condensing mark 501 by shifting the condenser lens 106.

Then, since the shape of the condensing mark 501, as described above, is nearly equal to the pit size of CD, focusing and tracking technology used for CD player can be utilized.

Astigmatism method using four-piece photo detector 103 and the cylindrical lens 107 of the optical photo element 100 is used for detecting the relative position between the light condensing mark 501 and the light condensing point along the height direction. Push-pull method using the two-piece photo detector 102 of the optical element part 100 is used for detecting the relative position in the planar direction of the recording medium 700.

The light used for detecting the light condensing mark 501 and the light condensing point is emitted from the optical element part 100, reflected back by the light condensing mark 501, launched again into the optical element part 100 and turned its direction orthogonally by the half mirror 104. Succeedingly, the light is divided into two beams by another half mirror 104 and one of the two beams is detected by the two-piece photo detector 102 and the other of the two beams is detected by the four-piece detector 103 after having been condensed only in one direction by the cylindrical lens 107. The lens actuator 108 shifts the condenser lens 106 based on the relative position between the detected light condensing point and the light condensing mark 501 so that the light condensing point can be controlled to follow the light condensing mark 501.

By means of these servo control, the light condensing point is controlled to follow the light condensing mark 501 so that the intensity of the incident light on the minute opening 1 can be made great and stable. Then, the generated near-field light is increased and held constant and the quantity of the detected light by the photo element part 200 can be increased. Therefore, the S/N of the detected signal from the photo element part 200 can be improved. In addition, a high speed scanning of the minute opening 1 over the surface of the recording medium 700 is made possible with the use of the slider 500. As described above, a high speed reproducing of the information from the high-density recording medium 700 is made possible.

Further, with the use of conventional lens servo control method of such kind used for optical disk, the information can be reproduced from the recording medium 700 recorded with high-density without requiring a complex control system. In addition, the near-field optical head 1000 can be produced at low price because the assembling accuracy as well can be maintained almost the same as that of the conventional optical disk apparatus.

Incidentally, the method for detecting the relative position between the light condensing mark 501 and the light condensing point and the method for controlling the relative position to follow the light condensing mark 501 is not restricted to the aforementioned method and apparatus.

Figure 6:
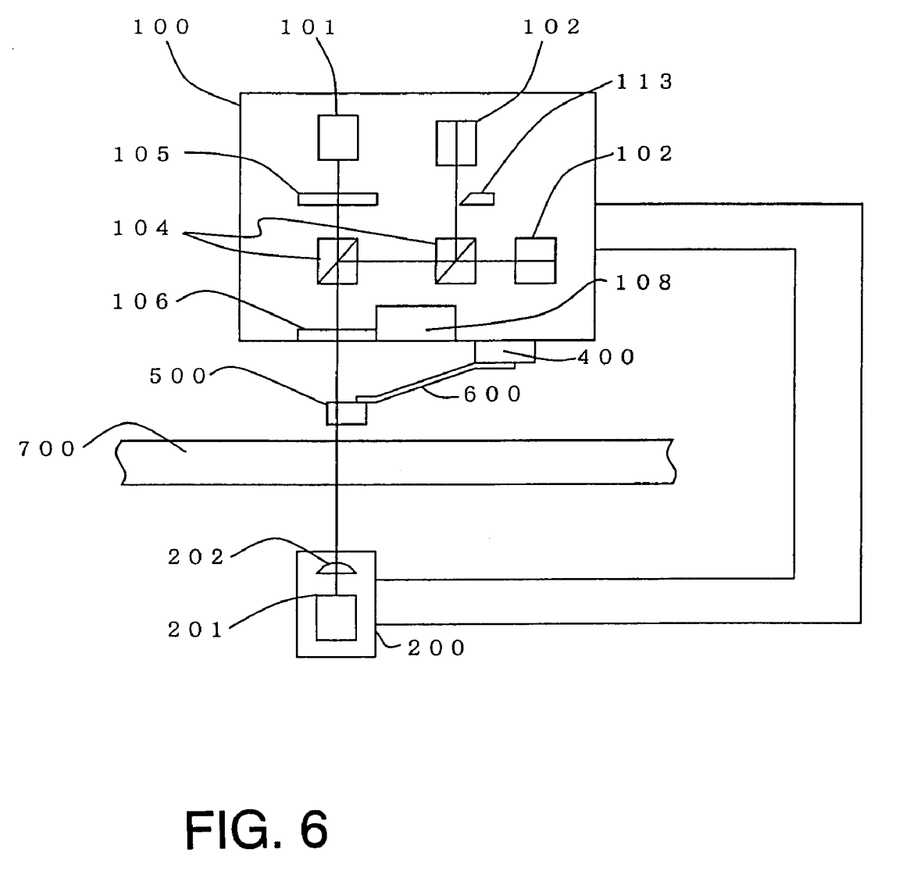
FIG. 6 is a block-diagram showing the near-field optical head related to the first embodiment according to the present invention.

For example, as shown in FIG. 6, a construction may be possible in which knife-edge method using the two-piece photo detector 102 of the photo element part 100 and a knife edge 113 is applied for detecting the relative position between the light condensing mark 501 and the light condensing point along the height direction and the aforementioned push-pull method is applied for detecting the relative position in the planar direction.

Figure 7:
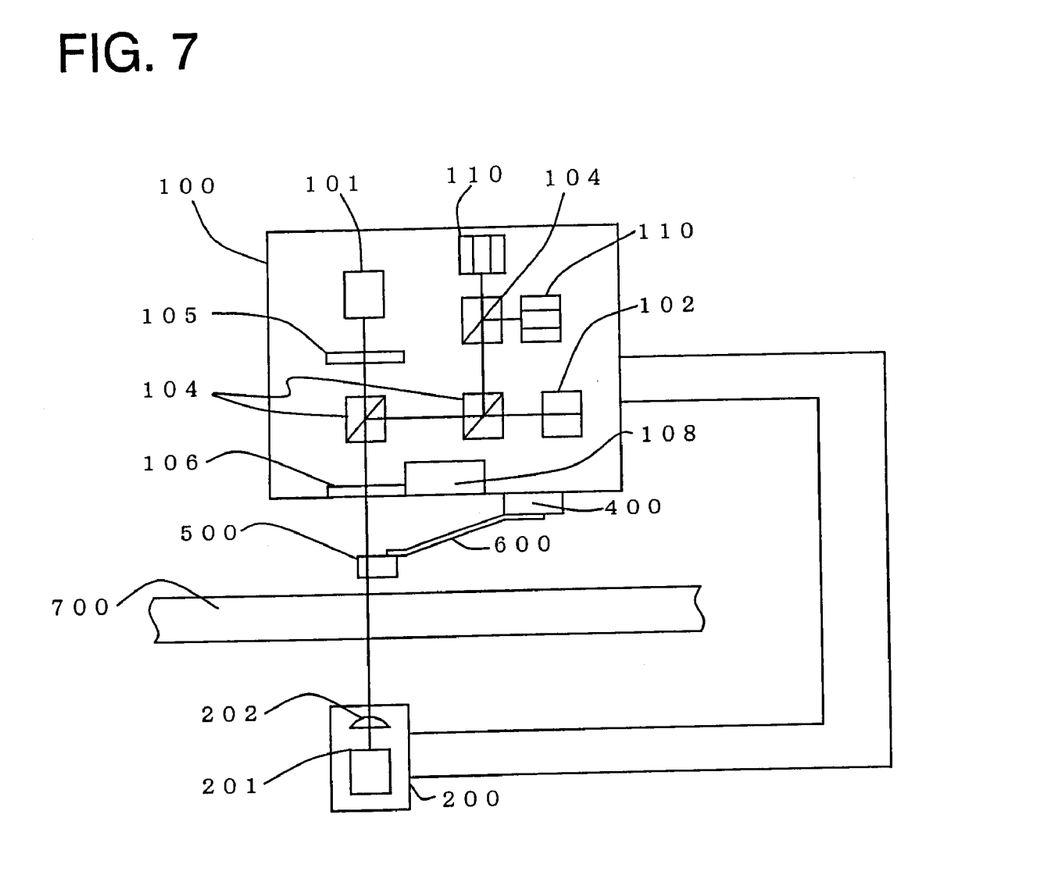
FIG. 7 is a block-diagram showing the near-field optical head related to the first embodiment according to the present invention.

Further, as shown in FIG. 7, a construction may be possible in which beam size detecting method using the half mirror 104 of the photo element part 100 and a pair of three-piece photo detector 110 is applied for detecting the relative position between the light condensing mark 501 and the light condensing point along the height direction and the aforementioned push-pull method is applied for detecting the relative position in the planar direction.

Figure 8:
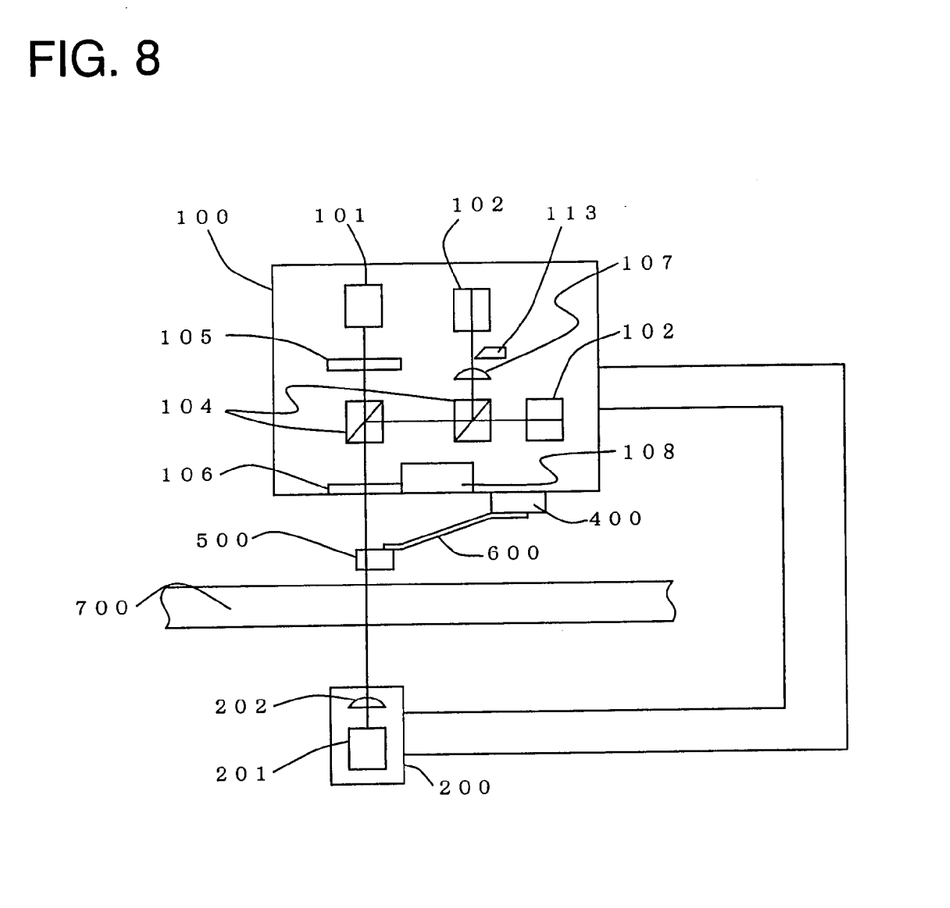
FIG. 8 is a block-diagram showing the near-field optical head related to the first embodiment according to the present invention.

Further, as shown in FIG. 8, a construction may be possible in which image rotation detecting method using the two-piece photo detector 102 and the cylindrical lens 107 of the photo element part 100 and a knife-edge 113 is applied for detecting the relative position between the light condensing mark 501 and the light condensing point along the height direction and the aforementioned push-pull method is applied for detecting the relative position in the planar direction.

Figure 9:
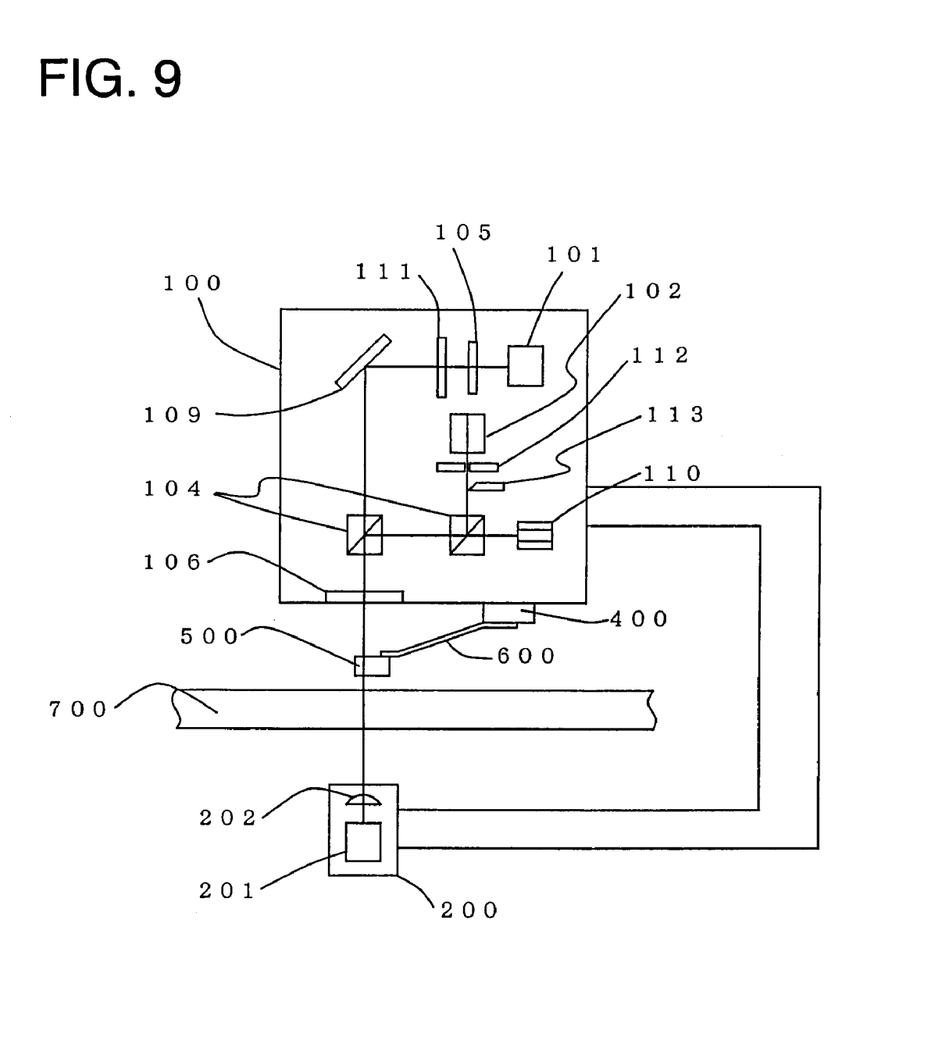
FIG. 9 is a block-diagram showing the near-field optical head related to the first embodiment according to the present invention.

Further, as shown in FIG. 9, a construction may be possible in which knife-edge detecting method using the two-piece photo detector 102 of the photo element part 100, the slit 112 and the knife-edge 113 is applied for detecting the relative position between the light condensing mark 501 and the light condensing point along the height direction and three beam method using the diffraction grating 111 and the three-piece photo detector 110 is applied for detecting the relative position in the planar direction. In addition, a construction may be possible in which a galvano mirror 109 is used as means for controlling the light condensing point to follow the light condensing mark 501 in the planar direction of the recording medium to control the light condensing point to follow the light condensing mark 501.

Incidentally, information recording with the use of near-field light is made possible by means of providing, for example, a thin film made of phase change material on the recording medium 700. This is due to an utilization of a nature that phase change material changes reversibly between a crystal phase and a amorphous phase by means of applying heat. As another phase change material like those is mentioned, for example, InSe, GeTe or etc.

When the near-field light generated from the minute opening 1 is irradiated on the recording medium 700 provided with a thin film made of phase change material, the near-field light is scattered on the surface of the recording medium 700. The scattered light is changed into heat on the surface of the phase change thin film, where only the minute area (within a range of about the radius of the minute opening 1) can be heated. In case of rapid cooling after the heating of the minute area of the phase change thin film to a temperature equal to or more than the melting point, only the minute area concerned changes into an amorphous phase. On the other hand, in case of irradiating near-field light of small intensity on the phase change thin film from the minute opening 1 and heating the film in a lower temperature than in the case of changing it into the amorphous phase, only the minute area of the phase change thin film is changed into a crystal phase. With the use of such irradiating method of near-field light, it is made possible to change the minute area within about the radius of the minute opening 1 from an amorphous phase into a crystal phase and vice versa repeatedly.

As the near-field optical head 1000 can generate near-field light of great intensity, a rapid and high-density recording of information on the recording minute 700 is made possible with the use of aforementioned phase change of the phase change thin film. In addition, by means of scanning the minute opening 1 generating highly intensive near-field light over the recording medium 700, an area in amorphous phase and an area in crystal phase can be defined voluntarily and precisely on the recording medium 700. Thus, it is made possible to record information repeatedly on the recording medium 700 at a high speed with high-density.

In case of reproducing the information from the recording medium 700 provided with the phase change thin film, because the optical characteristics such as reflection coefficient or light transmission factor differs between the amorphous phase and the crystal phase, information reproducing method using aforementioned near-field light can be applied. Incidentally, in order not to change the amorphous phase and the crystal phase once recorded, it is necessary to reproduce by means of near-field light having smaller intensity than the light used for the change into crystal phase.

As described above, according to the recording and reproducing construction of the recording medium 700 provided with a phase change thin film by the near-field light optical head 1000, it is made possible to record information repeatedly with high-density and also rapid recording and reproducing of the information becomes possible.

Figure 10:
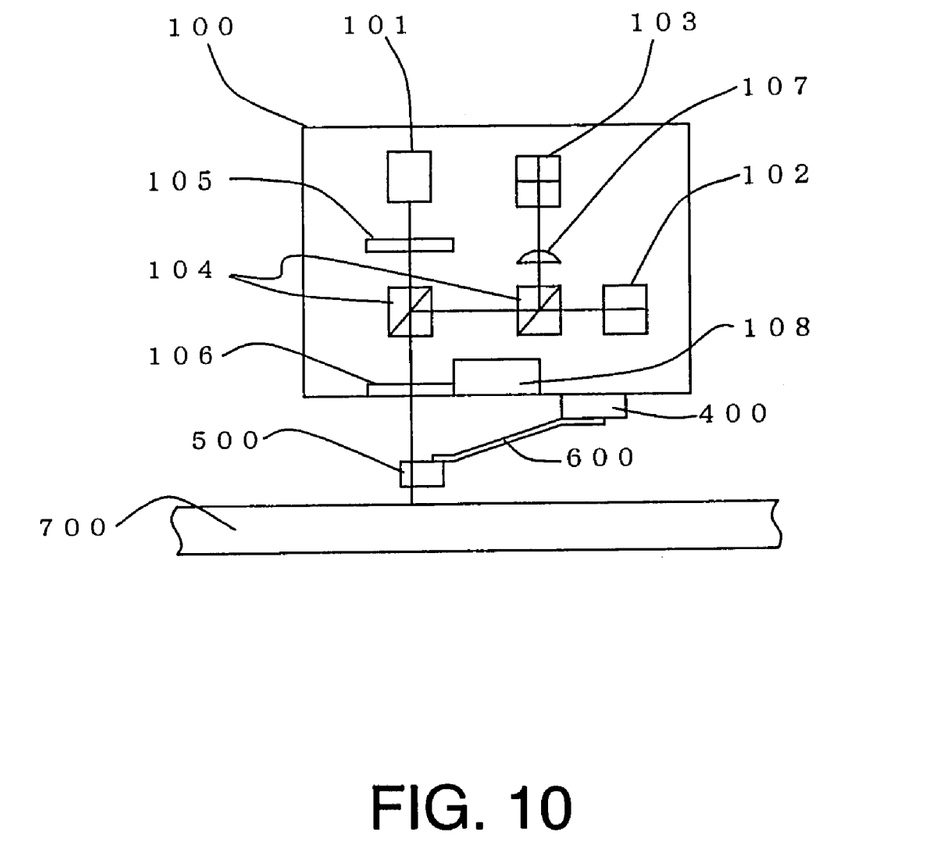
FIG. 10 is a block-diagram showing the near-field optical head related to the first embodiment according to the present invention.

In addition, as shown in FIG. 10, a construction in which recording and/or reproducing the information by the optical element part 100 may also be possible.

Likewise as mentioned above, the near-field light generated in the minute opening 1 is scattered on the recording medium 700. Afterwards, the scattered light launches into the minute opening 1 again and returns toward the condenser lens 106. The returned light is condensed by the condenser lens 106 and reflected back by the half mirror 104 to be detected by two-piece photo detector 102 and four-piece photo detector 103 for detecting the relative position between the light condensing mark 501 and the light condensing point. Therefore, it becomes possible to reproduce the information from the recording medium 700 from the sum total of the detected signals of the two-piece photo detector 102 and the four-piece photo detector 103. Consequently, the information recorded with high-density can be reproduced even by small number of the components.

An outline of the method for manufacturing the slider 500 is shown in FIG. 5.

Figure 5A:
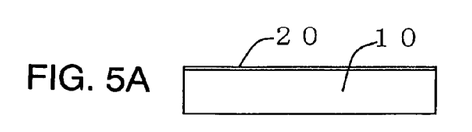
FIG. 5 are drawings showing a method for manufacturing near-field optical head related to the first embodiment according to the present invention.
Figure 5B:
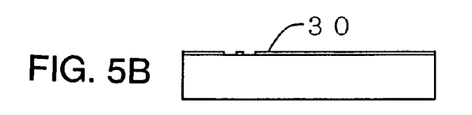
Figure 5C:
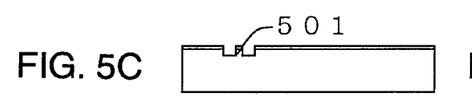
Figure 5D:
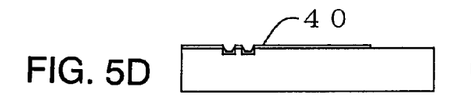
Figure 5E:
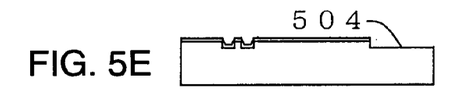
Figure 5F:
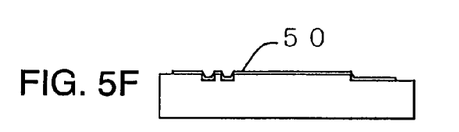
Figure 5G:
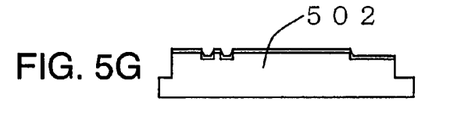
Figure 5H:
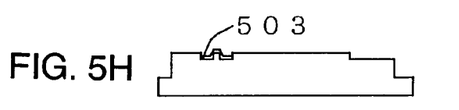
Figure 5I:
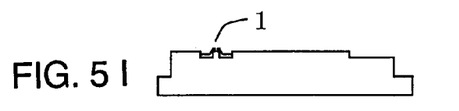

FIG. 5A shows a condition in which a resist 20 is applied on the surface of the silicon dioxide as the substrate 10. FIG. 5B shows a process of exposing the resist 20 and a process of patterning a mask 30 for forming the light condensing mark 501 in a rectangular shape. FIG. 5C shows a process of forming the light condensing mark 501 by etching. FIG. 5D shows a process of exposing resist and patterning the mask 40 for forming the minute down step 504 and FIG. 5E shows a process of forming the minute down step 504 by etching. FIG. 5F shows a process of exposing resist and a process of patterning a mask 50 for forming skiing part 502 and FIG. 5G shows a process of forming skiing part 502 by etching. FIG. 5H shows a process of sputtering aluminum on the light condensing mark 501 to form the reflective film 503. FIG. 5I shows a process of forming the minute opening 1 using FIB (Focused Ion Beam).

As for the method for producing the slider 500, in case of using semiconductor material such as silicon dioxide or silicon for the material of the slider 500, fine patterning using such as for example photolithography or anisotropic etching used in semiconductor processes can be employed. Therefore, the slider 500 can be produced precisely and collectively in large quantities.

As described above, according to the first embodiment, the intensity of the near-field light can be increased and made stable so that it becomes possible to provide the near-field optical head 1000 capable of rapid recording and reproducing of the information on the recording medium 700 which is recorded information with high-density. Further, the assembling accuracy as well can be controlled almost within the same degree as the conventional optical apparatus so that a cheap near-field optical head 1000 can be provided. Furthermore, by means of introducing semiconductor process into the manufacture of the slider 500 that requires the highest processing accuracy, the near-field optical head 1000 can be produced precisely and collectively in large quantities enabling a provision thereof at low price.

As described above, according to the near-field optical head related to the first invention, by means of irradiating condensed light on the light condensing mark, the energy density of the incident light on the minute opening can be increased so that the near-field light from the minute opening can be intensified. In addition, with the use of detecting means for detecting the relative position between the light condensing point and the light condensing mark and servo means for controlling the light condensing point to follow the light condensing mark, the light condensing point exists always on the light condensing mark so that the light can be irradiated continually with constant quantity on the minute opening provided in the light condensing mark. As a result, intensive and constant near-field light can be generated in the minute opening at all times so that rapid recording and/or reproducing of the information is realized using the near-field optical head.

Further, according to near-field optical head related to the second or the third invention, the light condensing point is controlled to follow the light condensing mark by means of the lens movement by the lens actuator or by means of the beam deflecting means so that the light of high energy density is irradiated on the light condensing mark at all times. Therefore, intensive and constant near-field light can be generated in the minute opening at all times so that rapid recording and/or reproducing of the information can be realized using the near-field optical head. In addition, as the light condensing point is controlled to follow the light condensing mark, similar function can be realized even though the manufacture or the assembly accuracy of the near-field optical head may be comparatively low. Therefore, cheap near-field optical head can be provided.

Further, according to the near-field optical head related to the fourth invention, because the light reflected back by the light condensing mark is used, the detection of the relative position between the light condensing point and the light condensing mark can be performed simultaneously with the recording and/or the reproducing of the information. Therefore, rapid recording and/or reproducing of the information can be realized.

Further, according to the near-field optical head related to the fifth to the twelfth invention, by means of applying conventional focusing technology for optical disk as means for detecting the relative position between the light condensing point and the light condensing mark along the direction approximately in perpendicular with the optical axis, highly precise detection of the relative position between the light condensing point and the light condensing mark along the direction approximately in parallel with the optical axis is made possible despite using a simplified structure. Therefore, intensive and constant near-field light can be generated in the minute opening at all times so that rapid recording and/or reproducing of the information is realized using the near-field optical head having a structure of this kind.

Further, according to the near-field optical head related to the thirteenth to the sixteenth invention, by means of applying conventional tracking technology for optical disk as means for detecting the relative position between the light condensing point and the light condensing mark along the direction approximately perpendicular to the optical axis, highly precise detection of the relative position between the light condensing point and the light condensing mark along the direction approximately perpendicular to the optical axis is made possible in spite of using a simplified structure. Therefore, intensive and constant near-field light can be generated in the minute opening at all times so that rapid recording and/or reproducing of the information can be realized using the near-field optical head having a structure of this kind.

Further, according to the near-field optical head related to the seventeenth invention, the reflected light from the upper side and the lower side of the light condensing mark interfere to each other and the position of the light condensing mark can be detected from the intensity distribution of the coherent light. Therefore, forming the shape of the light condensing mark precisely, the relative position between the light condensing mark and the light condensing point can be detected precisely even by a simplified structure. As a result, intensive and constant near-field light can be generated in the minute opening at all times so that rapid recording and/or reproducing of the information can be realized using the near-field optical head having a structure of this kind.

Furthermore, according to the near-field optical head related to the eighteenth invention, with the use of the floating slider, the relative speed between the minute opening provided on the floating slider and the recording medium with recorded information can be increased. As a result, a rapid scanning of the minute opening over the recording medium is made possible so that rapid recording and/or reproducing of the information is made possible using the near-field optical head.

What is claimed is:

1. A near-field optical head for recording and/or reproducing information on a recording medium using near-field light, the near-field optical head comprising:
   a lens for condensing light from a light source;
   a light condensing mark having a concave or a convex shape for reflecting the light, and having a minute opening;
   a detector for detecting a relative position between a light condensing point condensed by the lens and the light condensing mark; and
   servo mechanism for controlling the light condensing point to follow the light condensing mark.

2. The near-field optical head according to claim 1, wherein the servo mechanism comprises a lens actuator for moving the lens.

3. The near-field optical head according to claim 1, wherein the servo mechanism comprises beam deflecting element provided between the lens and the light source.

4. The near-field optical head according to claim 1, wherein the detector comprises a photo detector for detecting the reflected light from the light condensing mark.

5. The near-field optical head according to claim 4, wherein the detector employs knife-edge method for detecting the relative position between the light condensing point and the light condensing mark along the direction approximately in parallel with the optical axis.

6. The near-field optical head according to claim 5, wherein the detector comprises a two-piece photo detector for receiving a part of the reflected light and a knife-edge for cutting off a part of the reflected light.

7. The near-field optical head according to claim 4, wherein the detector employs astigmatism method for detecting the relative position between the light condensing point and the light condensing mark along the direction approximately in parallel with the optical axis.

8. The near-field optical head according to claim 7, wherein the detecting means comprises a four-piece photo detector for receiving a part of the reflected light and a cylindrical lens provided between the four-piece photo detector and the lens.

9. The near-field optical head according to claim 4, wherein the detector employs beam size detecting method for detecting the relative position between the light condensing point and the light condensing mark along the direction approximately in parallel with the optical axis.

10. The near-field optical head according to claim 9, wherein the detecting means comprises beam splitter means for dividing the reflected light into two beams and a pair of three-piece photo detectors each for receiving the split beam divided by the beam splitter means.

11. The near-field optical head according to claim 4, wherein the detector employs image rotation method for detecting the relative position between the light condensing point and the light condensing mark along the direction approximately in parallel with the optical axis.

12. The near-field optical head according to claim 11, wherein the detector comprises a two-piece photo detector for receiving a part of the reflected light, a cylindrical lens provided between the two-piece photo detector and the lens, and a knife-edge provided between the two-piece photo detector and the cylindrical lens.

13. The near-field optical head according to claim 4, wherein the detector employs three beam method for detecting the relative position between the light condensing point and the light condensing mark along the direction approximately perpendicular to the optical axis.

14. The near-field optical head according to claim 13, wherein the detector comprises a diffraction grating provided between the light source and the lens and a two-piece photo detector for receiving the reflected light reflected from the light condensing mark.

15. The near-field optical head according to claim 4, wherein the detector employs push-pull method for detecting the relative position between the light condensing point and the light condensing mark along the direction approximately perpendicular to the optical axis.

16. The near-field optical head according to claim 15, wherein the detecting means comprises a two-piece photo detector for receiving a part of the reflected light.

17. The near-field optical head according to claim 1, wherein the depth of the light condensing mark is approximately between one eighth and one fourth of the effective wavelength of the light irradiated on the light condensing mark.

18. The near-field optical head according to claim 1, wherein the minute opening is provided on a floating slider.

19. A near-field optical head for recording and/or reproducing information on a recording medium using near-field light comprising:
   a light source;
   a lens for condensing light from said light source;
   a light condensing mark having a concave or a convex shape for reflecting the light from said light source;
   a minute opening provided in said light condensing mark;
   detecting means for detecting the relative position between the light condensing point condensed by said lens and said light condensing mark; and
   servo means for controlling said light condensing point to follow said light condensing mark.

* * * * *